US007145761B2

(12) United States Patent
Shimizu et al.

(10) Patent No.: US 7,145,761 B2
(45) Date of Patent: Dec. 5, 2006

(54) DEGAUSSING COIL HOLDER

(75) Inventors: Kazuyuki Shimizu, Fukui (JP); Tomoyuki Harada, Fukui (JP); Masakuni Kobashi, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 448 days.

(21) Appl. No.: 10/742,759

(22) Filed: Dec. 23, 2003

(65) Prior Publication Data

US 2004/0136137 A1 Jul. 15, 2004

(30) Foreign Application Priority Data

Dec. 25, 2002 (JP) .......................... 2002-374149
Sep. 26, 2003 (JP) .......................... 2003-335492

(51) Int. Cl.
*H01H 47/00* (2006.01)
*H04N 5/65* (2006.01)
*F16B 19/00* (2006.01)
*H01J 29/06* (2006.01)

(52) U.S. Cl. ...................... 361/150; 348/825; 411/508; 315/8

(58) Field of Classification Search ................ 361/150; 348/825; 315/8; 411/508
See application file for complete search history.

(56) References Cited

U.S. PATENT DOCUMENTS 3,092,177 A * 6/1963 Kramer ...................... 160/404
4,665,588 A * 5/1987 Nakano .................... 24/16 PB
5,038,078 A * 8/1991 Duggan ......................... 315/8
5,343,111 A * 8/1994 Miwa et al. ................ 313/313
5,416,595 A * 5/1995 Wield ......................... 348/825
6,204,894 B1 * 3/2001 Manson ...................... 348/821

FOREIGN PATENT DOCUMENTS

| | | | |
|---|---|---|---|
| EP | 1427219 | A2 * | 6/2004 |
| JP | 7-282726 | | 10/1995 |
| JP | 2001-95003 | | 4/2001 |
| JP | 2001-285887 | | 10/2001 |

* cited by examiner

*Primary Examiner*—Brian Sircus
*Assistant Examiner*—Boris Benenson
(74) *Attorney, Agent, or Firm*—Wenderoth, Lind & Ponack, L.L.P.

(57) ABSTRACT

To provide a degaussing coil holder for fastening a degaussing coil around a cathode ray tube which is easy in use and capable of stretching and fastening the degaussing coil in position, the degaussing coil holder is made of a resin mold having a hook to hang the degaussing coil, a catch to fixedly fit in a small hole made in a selected CRT fastening metal and an expandable strip integrally connected at both ends to the hook and catch.

3 Claims, 8 Drawing Sheets

DEGAUSSING COIL HOLDER

BACKGROUND OF THE INVENTION

1. Field of the Invention

The present invention relates to a degaussing coil holder for fastening a degaussing coil around a cathode ray tube (CRT).

2. Related Art

The CRT is equipped with a shadow mask of a metal such as iron, and therefore the CRT is liable to be magnetized by a selected component of geomagnetism, which component runs in the same direction as the CRT is set. Even though a TV set is completely adjusted, the residual magnetism affects somewhat the electron beam in its traveling direction, thereby deteriorating the quality of pictures displayed on the CRT. It is, therefore, necessary that the shadow mask be demagnetized whenever the TV set is changed in position. For this purpose the degaussing coil is attached to the CRT.

In order to improve the efficiency with which degaussing coils can be attached to CRTs and to reduce the cost involved for assembly, a variety of degaussing coil holders have been hitherto proposed. JP 2001-285887(A) shows a "Degaussing Coil Holder" which comprises a flat seat having nails formed on its opposite sides to pinch a selected CRT fastening metal, and a catch extension integrally connected to the seat. The seat has an aperture to screw the degaussing coil holder to the cabinet.

The degaussing coil holder is tentatively fastened to a selected CRT fastening metal with the opposite nails pinching the CRT fastening metal, and then the degaussing coil holder is perpetually fastened with a screw, which is inserted in the aperture of the seat, and is tightened. Then, the catch extension is bent around the degaussing coil, which encircles the CRT. The catch extension is covered with a soft material so that it may not rub and strip the insulation of the degaussing coil.

The "Degaussing Coil Holder" is relatively complicated in structure, and accordingly it requires a complicated metal mold, which is expensive. The "Degaussing Coil Holder" holds the degaussing coil with its upright catch extension bent around the degaussing coil. It is, therefore, possible that the holding of the degaussing coil comes to be loose, and that the catch hook be dislocated along the degaussing coil. In holding the degaussing coil it is required that the degaussing coil holder is tentatively and then perpetually fastened to the CRT fastening metal, and that the catch extension is bent around the degaussing coil. This is a laborious work.

JP2001-95003(A) discloses a "Degaussing Coil Fastening Structure", and JP 7-282726(A) discloses a "Coil Clamp". Neither the Degaussing Coil Fastening Structure nor the Coil Clamp permits an easy and quick attachment of the degaussing coil to the CRT.

Also, the CRT has a braid wire attached to the CRT for grounding. As seen from FIG. 11, a CRT 8 is fastened at the four corners to the cabinet with fastening metals 9, and a braid wire 12 is stretched obliquely from a fastening metal 9 at a selected corner to another fastening metal 9 at the diagonally opposite corner.

The degaussing coil 7 is caught by the hooks 14, which are fixed to the fastening metals 9, and the degaussing coil 7 is stretched across the CRT 8. The braid wire 12 is connected to the selected fastening metals 9 via coiled springs 13. It happens that such coiled springs 13 rub the degaussing coil 7 until its insulation is stripped. Then, the degaussing coil can be short-circuited to the earth.

Each coiled spring 13 is next to the hook 14. It is, therefore, possible that the degaussing coil 7 and braid wire 12 come to contact and push away from each other. The resultant displacement of the degaussing coil 7 and braid wire 12 may cause an adverse effect on their functions.

In view of the above, one object of the present invention is to provide an improved degaussing coil holder which is easy to use, and simple in shape, not requiring a complicated (and hence, expensive) metal mold, and is capable of stretching and fastening the degaussing coil in position.

SUMMARY OF THE INVENTION

To attain this object, a degaussing coil holder for fastening a degaussing coil around a CRT according to the present invention is a linear piece of a resin material, which comprises: a hook to hang the degaussing coil; a catch to fixedly fit in a small hole made in a selected fastening metal for fastening the CRT to a cabinet, and an expandable strip integrally connected at both ends to the hook and catch.

The catch may be formed in a shape of a letter "T" or an arrowhead. The hook may have an engagement piece integrally connected to the hook for mounting a coiled spring.

A small hole other than those for fastening the CRT to the cabinet is made in the fastening metal, and the catch is deformed and inserted into the small hole, so that it is fixed to the fastening metal when it returns to its original shape.

According to the degaussing coil holder of the present invention, it is possible to easily mount the holder to the fastening metal of the CRT with just one operation, and it is also possible to hang a degaussing coil on the hook of the holder with just one operation, thereby making the fastening work of the degaussing coil easier.

Due to the expandable strip of the degaussing coil holder, the degaussing coil is pulled so as not to cause any looseness, thereby holding the coil at a certain position.

Further, the degaussing coil holder is made of resin and, accordingly, it is possible to form the coil holder integrally, thereby reducing the manufacturing cost, and it is easy to make the metal mold thereof due to the simplified shape.

Furthermore, a coiled spring for stretching a braid wire can be fixed to the engagement piece at the distal end of the hook of the holder such that the braid wire neither rubs the degaussing coil nor strips its insulation to cause short-circuit. As the coil spring is connected to the distal end of the holder, the degaussing coil and the braid wire can be fastened in position without displacement due to touching each other.

Other advantages and objects will be understood from the accompanying drawings, which show degaussing coil holders according to some preferred embodiments of the present invention.

DETAILED DESCRIPTION OF PREFERRED EMBODIMENT

Figure 1:
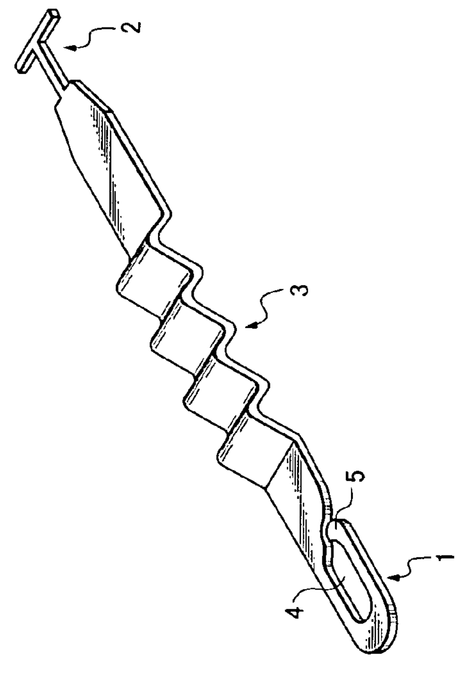
FIG. 1 is a perspective view of a degaussing coil holder according to a first embodiment of the present invention.

Referring to FIG. 1, a degaussing coil holder according to the first embodiment of the invention is a linear resin mold comprising a hook 1, a catch 2, and an expandable strip 3 integrally connected at both ends to the hook 1 and the catch 2. The hook 1 is formed in a shape of the letter, "U", having a grip aperture 4 to let the degaussing coil 7 fit therein. The hook end 5 can be twisted and raised to open the loop hole wide, so that the degaussing coil 7 may be pushed into the grip aperture 4 after passing through the wide-opened loop hole.

Figure 8:
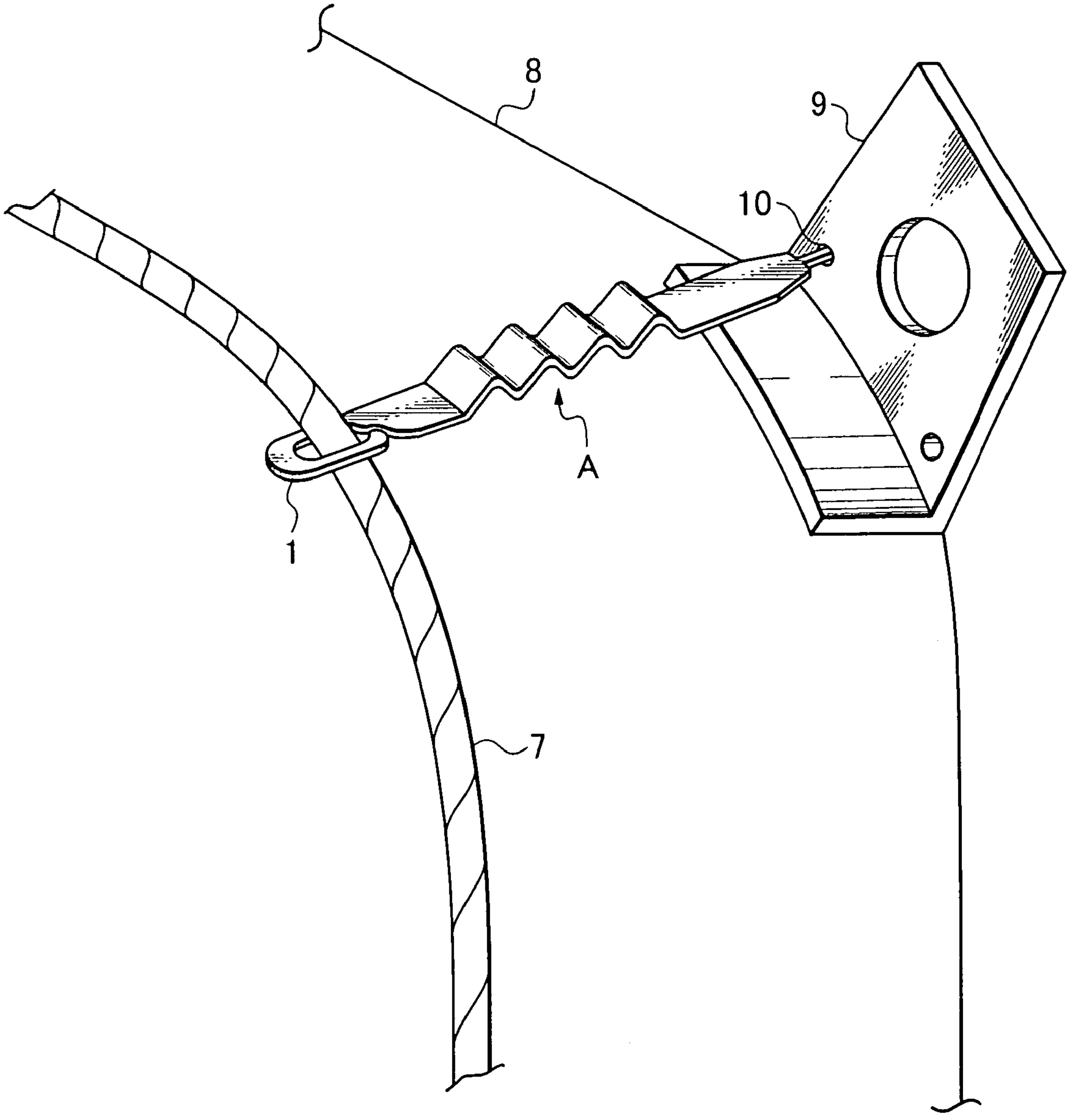
FIG. 8 is an enlarged perspective view of the degaussing coil holder, illustrating how it is used.

The catch 2 is formed in a shape of the letter "T", and it can be fixedly fit in a small hole 10, which is purposely made in the metal piece 9 for fastening the CRT to the cabinet (see FIG. 8). The expandable strip 3 takes a wavy form, and it is thin and flexible enough to yieldingly extend when the degaussing coil holder is stretched.

Figure 2:
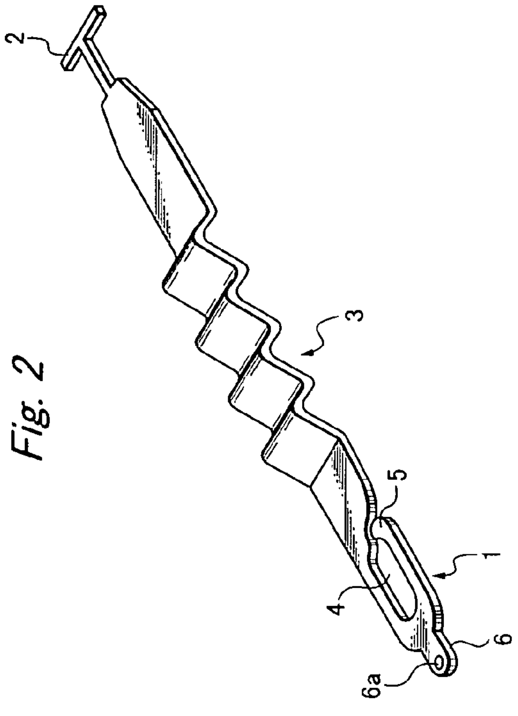
FIG. 2 is a perspective view of a degaussing coil holder according to a second embodiment of the present invention.

Referring to FIG. 2, a degaussing coil holder according to the second embodiment is different from the first embodiment of FIG. 1 only in that the hook 1 has an engagement piece 6 integrally connected to the hook 1. The engagement piece 6 has a small hole 6*a* made in its tip. A coiled spring 11 (see FIG. 9) can be fixed to the engagement piece 6 by inserting its end in the small hole 6*a* and linking to the engagement piece 6.

Figure 3:
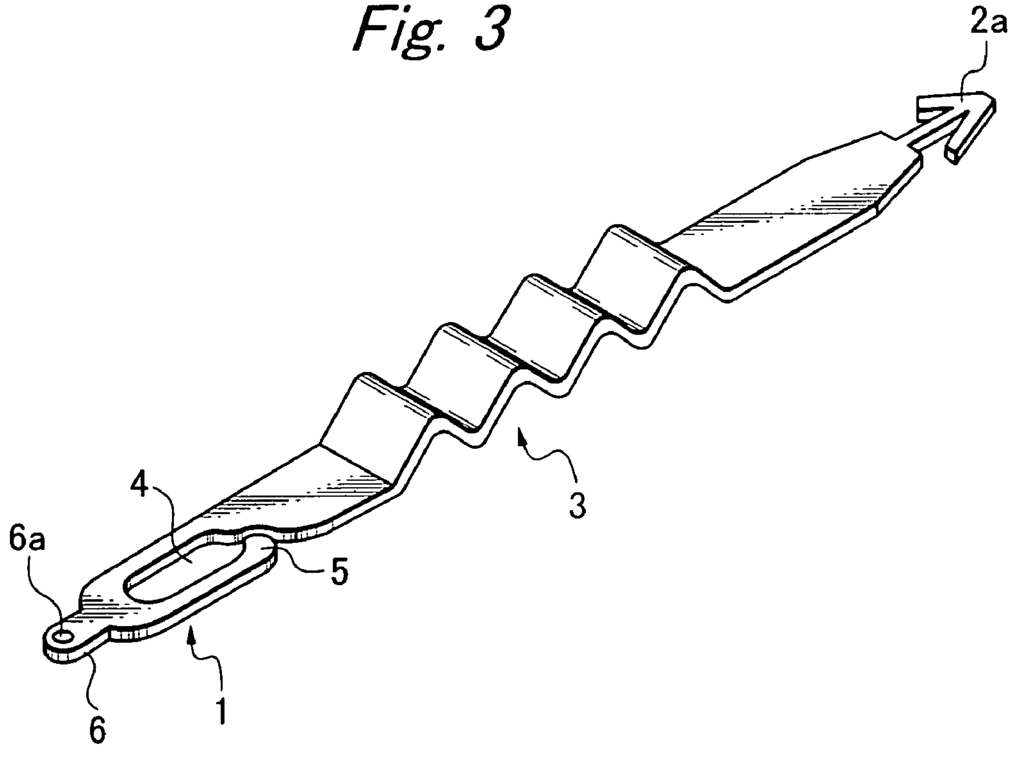
FIG. 3 is a perspective view of a degaussing coil holder according to a third embodiment of the present invention.

Referring to FIG. 3, a degaussing coil holder according to the third embodiment is different from the second embodiment of FIG. 2 only in that the catch takes the shape of an arrowhead 2*a*. This particular shape facilitates insertion of the catch 2 into the small hole 10 of the CRT fastening metal 9.

Figure 4:
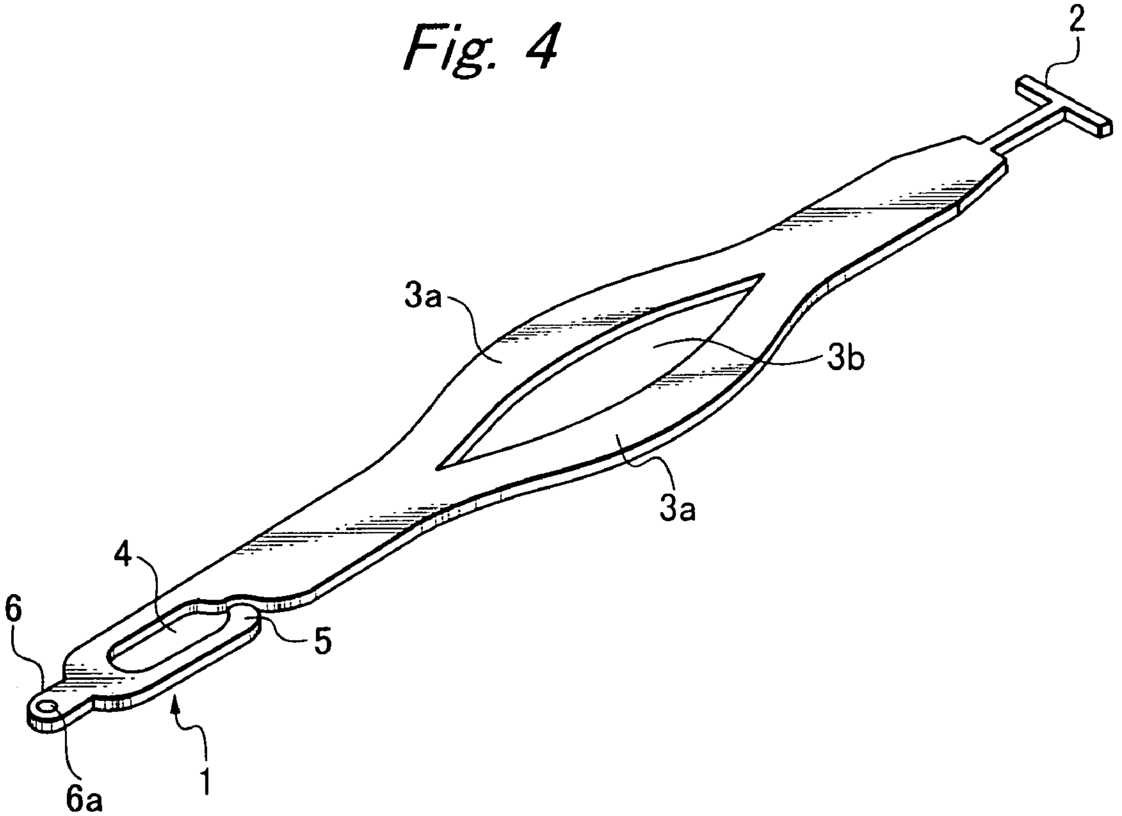
FIG. 4 is a perspective view of a degaussing coil holder according to a fourth embodiment of the present invention.

Referring to FIG. 4, a degaussing coil holder according to the fourth embodiment is different from the second embodiment of FIG. 2 only in that the expandable strip 3*a* takes the "eyeliner" shape. The opposite convex sections 3*a* and 3*a* delimits a convexo-convex opening 3*b*. The expandable strip can vary its length, allowing the "eyeliner" shape to vary.

Figure 5:
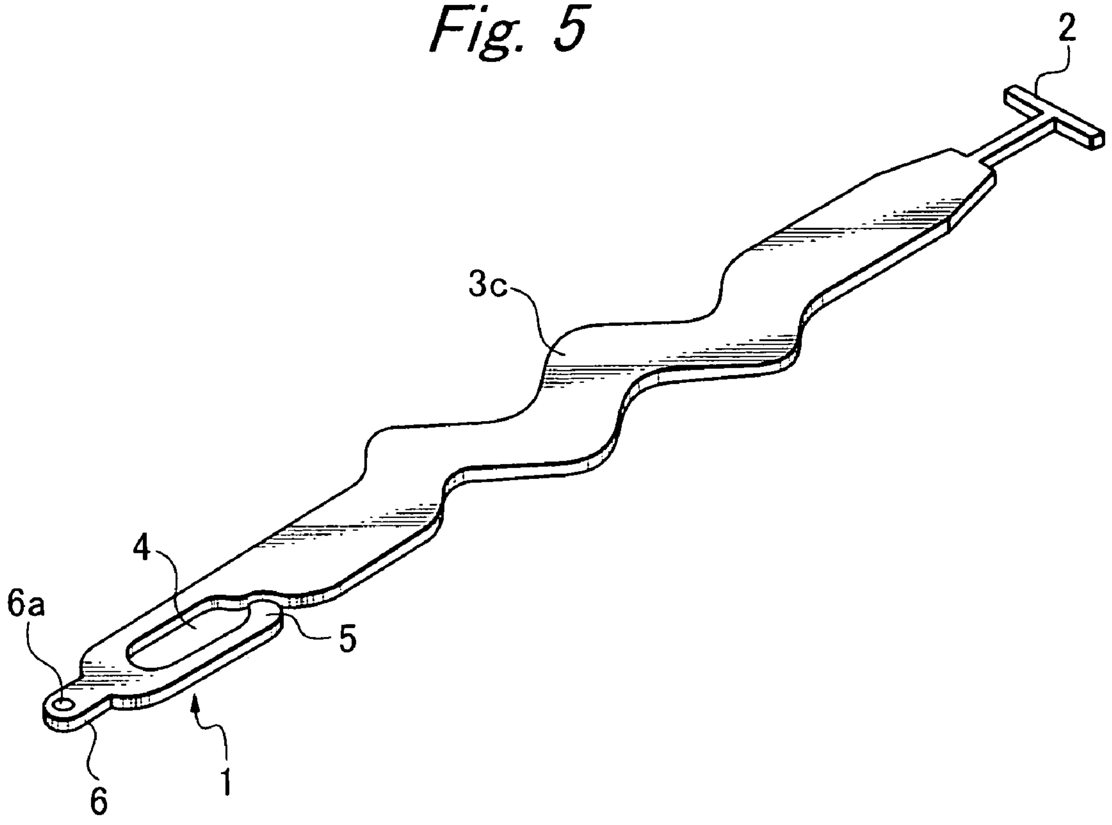
FIG. 5 is a perspective view of a degaussing coil holder according to a fifth embodiment of the present invention.

Referring to FIG. 5, a degaussing coil holder according to the fifth embodiment is different from the second or fourth embodiment only in that the expandable strip 3*c* takes a serpentine shape.

Figure 6:
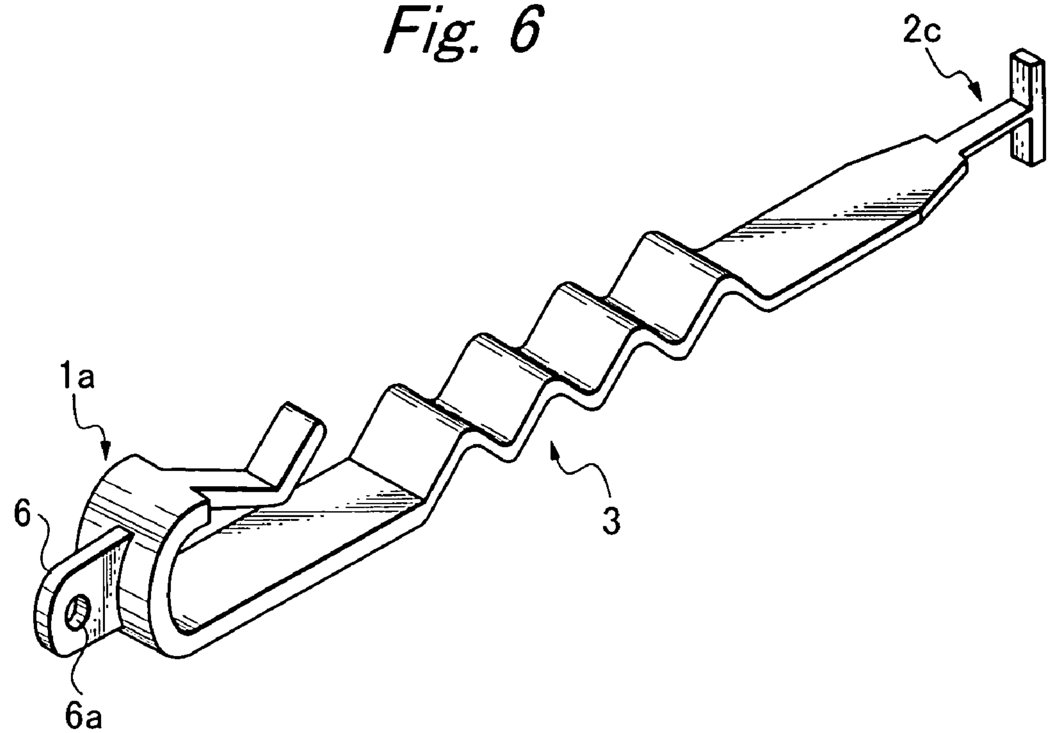
FIG. 6 is a perspective view of a degaussing coil holder according to a sixth embodiment of the present invention.

Referring to FIG. 6, a degaussing coil holder according to the sixth embodiment is a resin mold comprising a hook 1*a*, a "T"-shaped catch 2*c*, a resilient strip 3 integrally connected at both ends to the hook 1*a* and the catch 2*c*. The hook 1*a* is bent to be like a fishhook, and an engagement piece 6 is integrally connected to the hook 1*a*, projecting forward.

Figure 7:
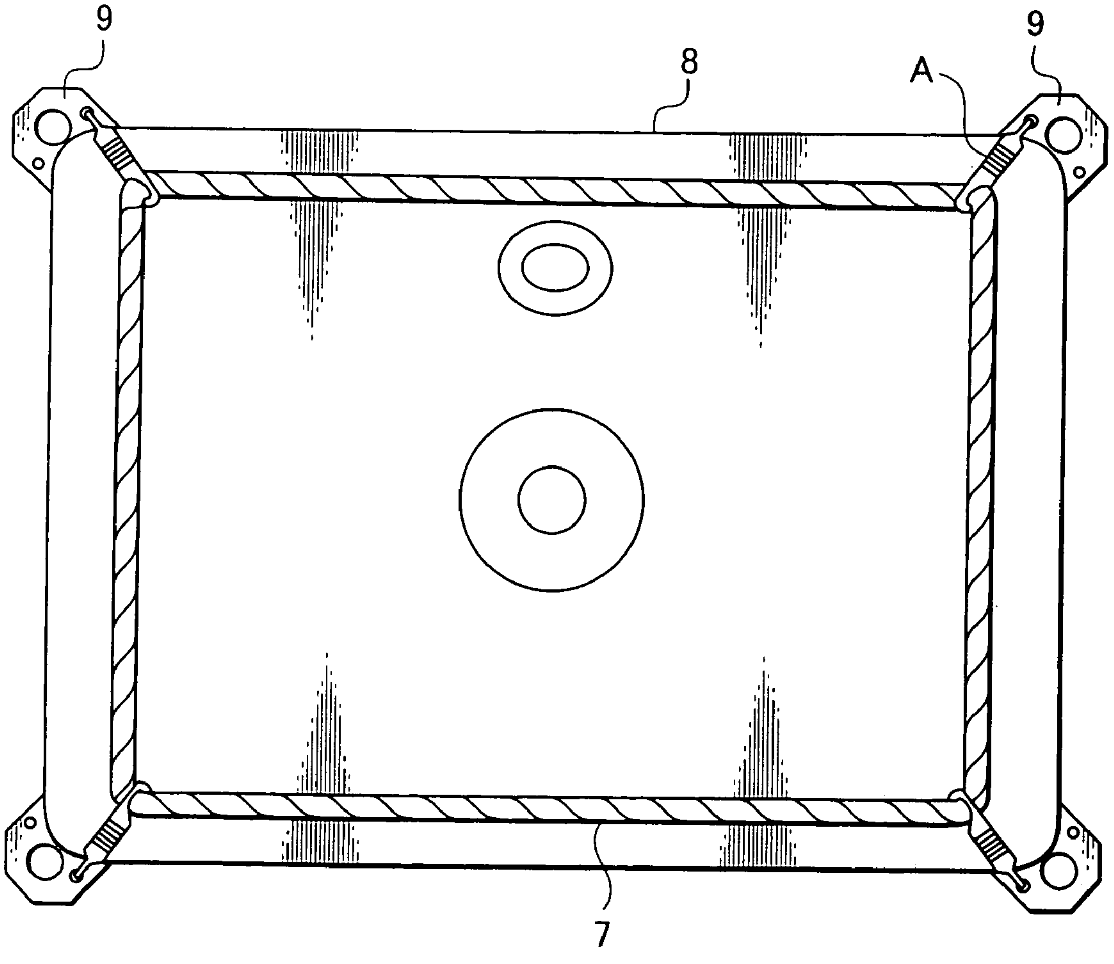
FIG. 7 is a rear view of the CRT, illustrating how the degaussing coil holders are used.

FIG. 7 illustrates how the degaussing coil 7 can be fastened with the degaussing coil holders "A" according to the first embodiment. The degaussing coil 7 is put around the CRT 8, and is pulled outwards by the holders "A" at four points. Referring to FIG. 8, the CRT 8 has fastening metals 9 fixed to its four corners, and each holder "A" is linked to the fastening metals 9 with the catch 2 caught in one of the opposite small holes 10, which are made in the CRT fastening metal 9. The "T"-shaped catch 10 is deformed into a linear, slender shape to be inserted in the small hole 10, and then, the deformed catch is allowed to retum to its original shape to be caught by the small hole 10.

The degaussing coil 7 passes through the "U"-shaped hole of the hook 1, and it is stretched by the stretcher 3 of the holder. The degaussing coil 7 can be moved in the "U"-shaped hole of the hook 1, so that the degaussing coil 7 may be reset by displacing selected hooking points.

Figure 9:
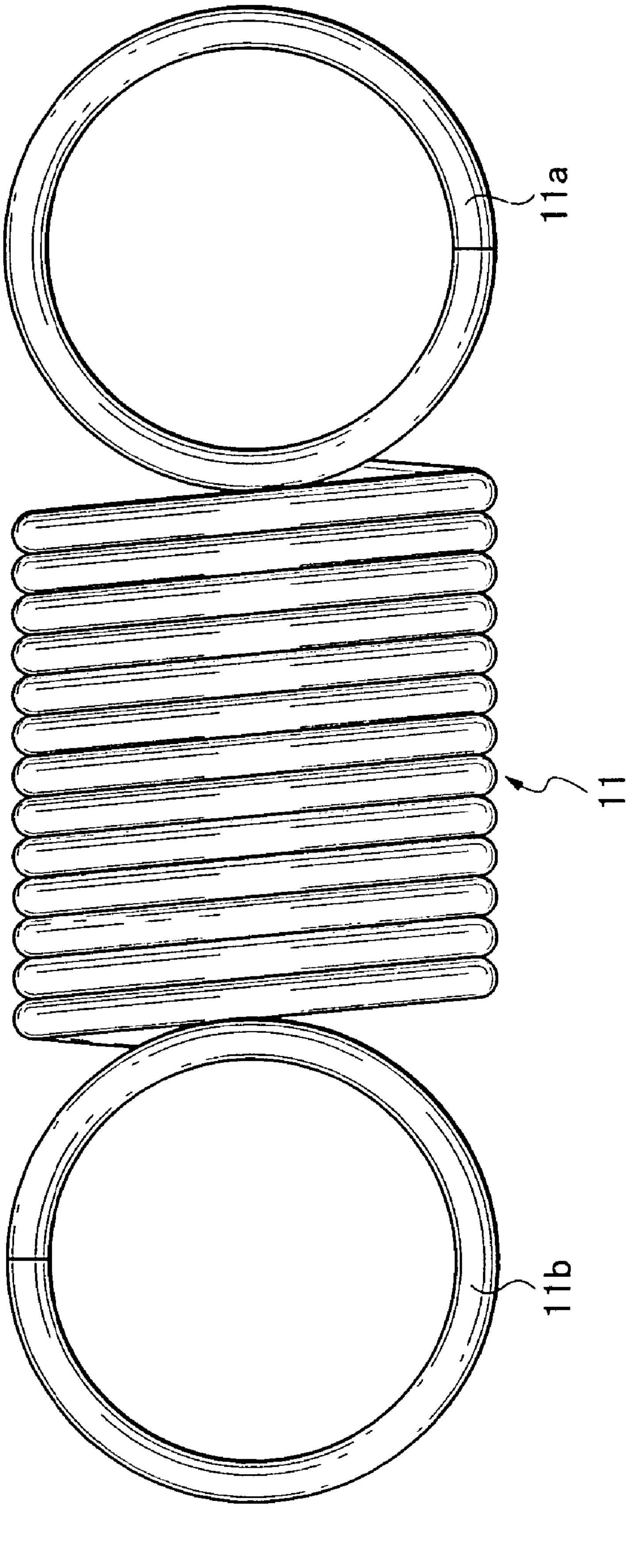
FIG. 9 is a front view of a coiled spring to stretch a braid wire.
Figure 10:
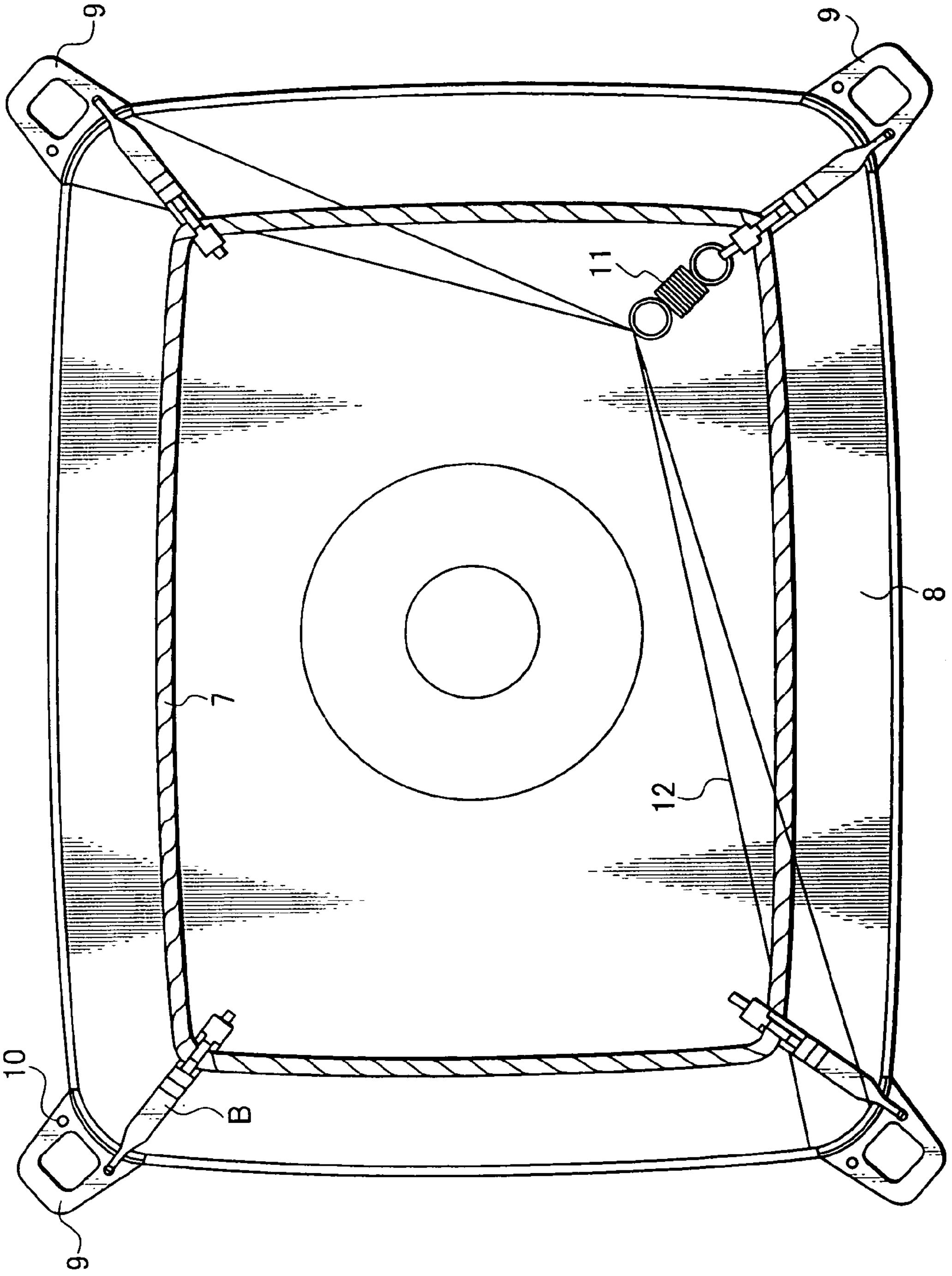
FIG. 10 is a rear view of the CRT, illustrating how the braid wire is stretched by the coiled spring mounted to the degaussing coil holder.
Figure 11:
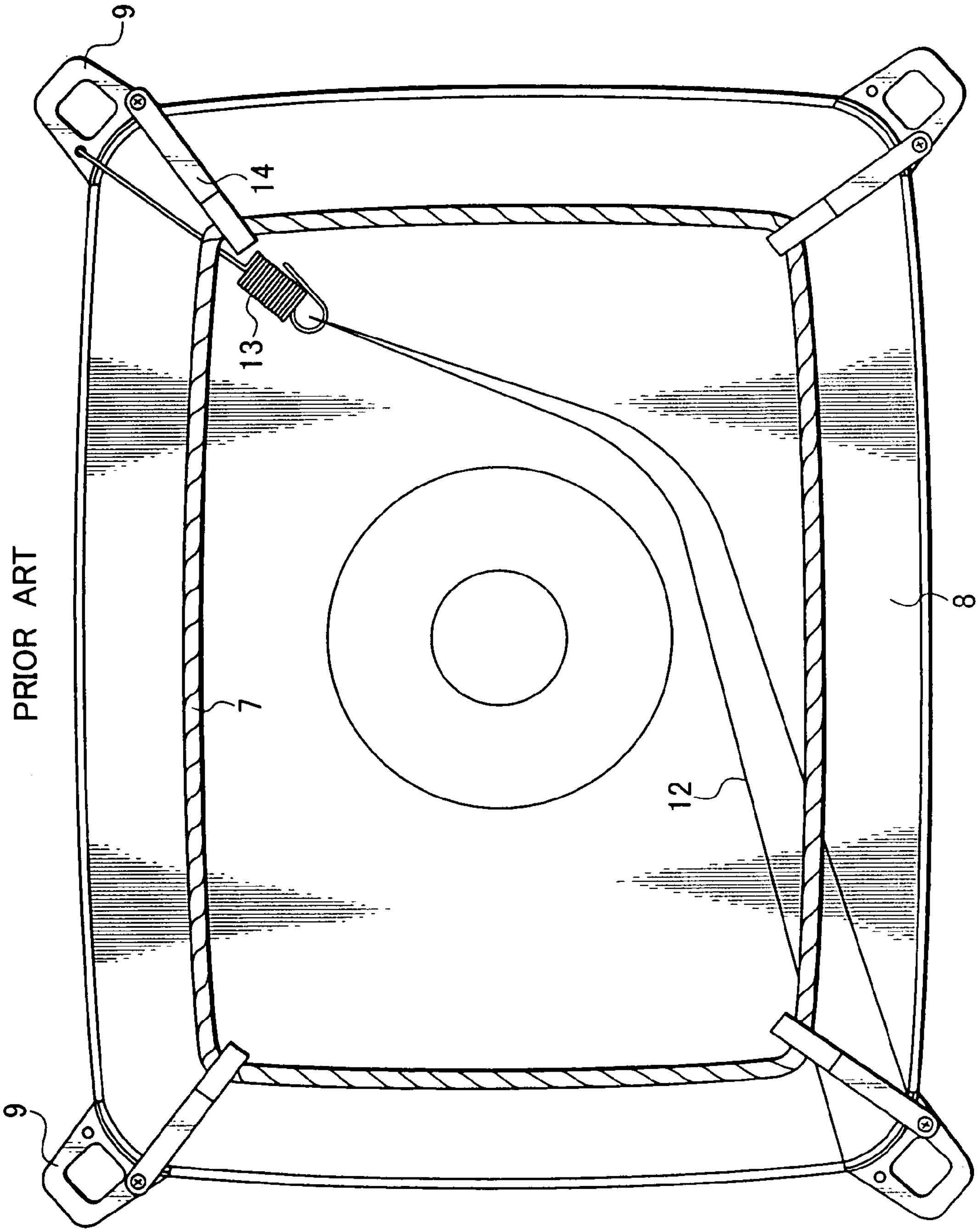
Fig. 11 PRIOR ART
FIG. 11 is similar to FIG. 10, but illustrates the conventional way in which the braid wire is stretched by the coiled spring.

FIG. 9 shows a coiled spring 11 to stretch a braid wire 12. It has two rings 11*a* and 11*b* formed at its opposite ends. FIG. 10 shows how the braid wire 12 is stretched by a coiled spring-and-degaussing coil holder. Specifically, a degaussing coil holder "B" according to the sixth embodiment is connected to a coiled spring 11, which stretches the braid wire 12. The braid wire 12 has its opposite ends fixed to the CRT fastening metals 9, which are arranged at two diagonally opposite corners of the CRT 8. Thus, the braid wire 12 is applied closely to the CRT 8 to ground it.

To stretch tightly the braid wire 12, the coiled spring 11 is fastened by one ring 11*a* to the engagement piece 6 of the degaussing coil holder B, and by the other ring 11*b* to the braid wire 12, which passes through the other ring 11*b*. The braid wire 12 is kept stretched so that it may be closely applied to the CRT 8. The coiled spring 11 is kept apart from the degaussing coil 7, and therefore, the degaussing coil 7 cannot be rubbed by the coiled spring 11. There is, therefore, no fear of stripping the braid wire of its insulation, which is a cause for short-circuiting.

What is claimed is:

1. A degaussing coil holder for fastening a degaussing coil around a cathode ray tube, the degaussing coil holder comprising:

a hook to hang the degaussing coil;

a catch to fixedly fit in a small hole made in a fastening metal for fastening the cathode ray tube to a cabinet; and an expandable strip integrally connected at a first end thereof to the hook and at a second end thereof to the catch, wherein the degaussing coil holder is formed of a resin material, and wherein the hook has an engagement piece integrally connected thereto for mounting a coiled spring.

2. A degaussing coil holder according to claim 1, wherein the catch is formed in a shape of a letter "T".

3. A degaussing coil holder according to claim 1, wherein the catch is formed in a shape of an arrow head.

* * * * *